United States Patent [19]

Sterzel

[11] Patent Number: 4,921,655
[45] Date of Patent: May 1, 1990

[54] PREPARATION OF COMPACT, CRYSTALLINE AND PORE-FREE MOLDINGS FROM OXIDE CERAMIC

[75] Inventor: Hans-Josef Sterzel, Dannstadt-Schauernheim, Fed. Rep. of Germany

[73] Assignee: BASF Aktiengesellschaft, Ludwigshafen, Fed. Rep. of Germany

[21] Appl. No.: 188,417

[22] Filed: Apr. 29, 1988

[30] Foreign Application Priority Data

May 8, 1987 [DE] Fed. Rep. of Germany ....... 3715278

[51] Int. Cl.$^5$ .............................................. C04B 35/64
[52] U.S. Cl. ....................................... 264/66; 264/65; 264/332; 501/12
[58] Field of Search ..................... 264/56, 65, 66, 332; 501/12

[56] References Cited

U.S. PATENT DOCUMENTS

| | | | |
|---|---|---|---|
| 4,418,024 | 11/1983 | Prochazka | 501/12 |
| 4,608,215 | 8/1986 | Gonczy | 501/12 |
| 4,680,047 | 7/1987 | Clasen | 501/12 |
| 4,734,234 | 3/1988 | Sterzel | 264/65 |

FOREIGN PATENT DOCUMENTS

3504145 6/1986 Fed. Rep. of Germany .

OTHER PUBLICATIONS

Sakka Sumio, Gel Method for Making, Treatise on Materials Science and Technology, vol. 22, Academic Press, 1982, pp. 129–167.
Szweda, The Preparation of Silicon Nitride from Silica by Sol-Gel Processing, Proc. Br. Ceramic Soc., 1981, 31, No. Spec. Ceram. 7, pp. 107–118.
Glass . . . Current Issues–Edited by A. F. Wright and J. Dupuy–Comparison of Crystallization Behavior of Oxides, Metals and Gel-Derived Glasses, pp. 16–19; 49–53; 221–223, 1985.
Science of Ceramic Chemical Processing, Ed: L. L. Hench and Dr. R. Ulrich, John Wiley & Sons, 1986, pp. 173–183.
Better Ceramics Through Chemistry II, Materials Research Society Symposia Proceedings, vol. 73, pp. 71, 85, 121, 444, 446, and 565, Apr. 1986.
Journal Phys. Chem. Solids, 45, No. 10, pp. 1069, 1074, 1984.
Journal Amer. Chem. Soc., 66, No. 11, p. 758, 1982.

*Primary Examiner*—James Derrington.
*Attorney, Agent, or Firm*—Keil & Weinkauf

[57] ABSTRACT

In the preparation of compact, crystalline and pore-free moldings from an oxide ceramic, amorphous oxide powders of beryllium, magnesium, aluminum, boron, zirconium, thorium or silicon or mixed oxides of silicon with these elements, in which some of the oxygen is replaced by bound nitrogen, are used as starting materials. These amorphous oxide powders containing bound nitrogen are compressed in a first stage at above the glass transition temperature but below the crystallization temperature to give a glassy molding, and the latter is then heated in a second stage to above the crystallization temperature. In the case of the individual oxides, from 5 to 30% of the oxygen are replaced by bound nitrogen, and in the case of the mixed oxides of silicon with these elements from 50 to 90% of the oxygen are replaced by bound nitrogen.

3 Claims, No Drawings

PREPARATION OF COMPACT, CRYSTALLINE AND PORE-FREE MOLDINGS FROM OXIDE CERAMIC

The present invention relates to a process for the preparation of compact, pore-free and crystalline moldings from oxide ceramic.

Oxide ceramics are sintered materials of pure metal oxides having a high melting point, the said materials consisting essentially of only a single crystalline phase. In contrast, the conventional ceramic materials, eg. porcelain, consist of a plurality of crystalline phases which are embedded in a glassy amorphous phase (Ullmann, Encyklopädie der technischen Chemie, Volume 17, 1977, pages 515–529).

Moldings of oxide ceramic are prepared by a method in which the oxide powders are converted to a paste with organic assistants, such as surfactants, waxes, heat-setting or thermoplastic polymers and, if required, sinter assistants, the free-flowing material is pressed into a mold, the organic additives are burned out of the resulting green compact and the moldings are then sintered at elevated temperatures, under atmospheric or superatmospheric pressure. A wide variety of sintering processes, such as hot pressing, hot-isostatic pressing and, preferably, sintering under atmospheric pressure, have been developed for this purpose.

Hot pressing is the simultaneous use of pressure and heat. The disadvantage of this process, which as such is expensive, is that it can only be used to produce moldings of simple geometry which have to be further machined with diamond tools to achieve dimensional accuracy.

In hot-isostatic pressing, the molding is compacted from all sides at the sintering temperature under high gas pressure using an inert gas. Advantageously, hot pressing is combined with hot-isostatic pressing by a procedure in which hot pressing is carried out until the outer pores are closed, after which the molding can be further sintered by the hot-isostatic method.

Oxide ceramic moldings are generally sintered under atmospheric pressure. One disadvantage of the sintering process is that the great shrinkage (the linear shrinkage may be up to 18%) results in only very low dimensional accuracy.

If assistants are used for sintering, they react with the surface of the oxide ceramic powders, where they form a glass phase which is liquid under the sintering conditions. On cooling, this intergranular glass phase is retained and, because of its relatively low softening temperature, reduces the strength of the moldig above this softening temperature. Moreover, the glass phase promotes subcritical crack propagation under load and hence reduces the life of the molding.

There is a plurality of suitable methods for producing the blanks or green compacts:

For medium-sized series, the ceramic slip casting process is used. In this process, the starting powder is mixed with a liquid to give a slip, which is poured into a porous mold until the latter is full. The ceramic blank is formed by withdrawing the liquid from the mold. The ceramic mold can be produced relatively cheaply.

For large series, the automatic dry pressing process or the injection molding process is used. Both require expensive molds but have very short cycle times. For complicated shapes, injectionn molding is used. In this procedure, thermoplastics and/or waxes are added to the material, and the mixture is heated in a suitable machine and forced into the mold, in which the plastic cures. The process requires a further step, ie. the elimination of the plastic by pyrolysis. This process makes the method substantially more difficult, especially in the case of products which must not contain any carbon. Pyrolysis is effected at increasing temperatures up to 500° C. and may take several days, depending on wall thicknesses.

However, the injection molding method also has serious disadvantages. The abrasive ceramic material removes chips from the metal surfaces of the barrel, screw and mold, and these chips remain in the material and produce defects during sintering. In addition, shearing of the material results in material stresses during injection into the mold, and these stresses may lead to cracks in the subsequent heat treatment.

An important problem in the production of ceramic moldings is achieving uniformity within a single piece and from piece to piece. Inhomogeneities immediately result in stresses in these materials which do not undergo plastic deformation, the said stresses influencing the strength.

Because of the inhomogeneities and microcracks having dimensions of from 10 to 80 $\mu$m, it has been impossible to date to produce ceramic moldings which have a high load capacity and whose strength, particularly at high temperatures, is constant within limits admissible for structural purposes. This is all the more important for use in practice, since there is still no reliable non-destructive test method which conforms to practical requirements and permits rejection of the unsuitable moldings.

German Laid-Open Application DOS 3,504,145 discloses that, for the production of compact, crystalline, pore-free moldings of silicon nitride, amorphous silicon nitride powder is used as a starting material and is pressed in a first stage at from 1200° to 1350° C. and under from 50 to 600 kp/cm$^2$ to give a glassy molding and, in a second stage, the silicon nitride is converted to crystalline silicon nitride at from 1400° to 1800° C. without the use of pressure.

Furthermore, Glass-Current Issues, 1985, Ed. by A. F. Wright and J. Dupuy, 1985, Martinus Nijhoff Publishers, pages 16–18, discloses that gel-like or amorphous oxide powders are used in the production of glasses; however, a difficulty which has not yet been overcome is that the viscous flow occurring at elevated temperatures competes with crystallization. Pages 49–53 of the same publication state that such powders should be processed close to the glass transition temperature, where, because of the high temperature, the crystallization rate is low. Very generally, it is true that, with increasing temperature, the viscosity decreases and the crystallization rate increases (Science of Ceramic Chemical Processing, Ed. L. L. Hench and D. R. Ulrich, John Wiley and Sons, 1986, pages 173–183). As stated in Glass-Current Issues (loc cit, pages 221–223), in the production of a glass by sintering a gel, it should be ensured that the time and temperature are matched with one another in such a way that no crystallization occurs.

However, this requirement frequently cannot be met since, for some amorphous gel-like metal oxide powders, the temperature at which viscous flow begins and that at which the amorphous powder begins to crystallize overlap one another, ie. crystallization is observed before compaction to a pore-free amorphous molding is complete.

Unfortunately, in addition to the viscosity of the glasses, their tendency to crystallize too is greatly dependent on the preparation conditions for the starting powders. In Material Research Symposium Proceedings, Vol. 73 (Better Ceramics Through Chemistry II), 1986, some examples are given in this context: if alumina is prepared by hydrolysis of aluminum propionate and the resulting amorphous powder is immediately dried under reduced pressure, it crystallizes at 800° C. to give $\alpha\text{-}Al_2O_3$. If, on the other hand, the reaction mixture is subjected to ultrasound, the amorphous powder crystallizes at as low as room temperature (page 565).

This also applies to zirconium dioxide having a glass transition temperature of about 1700° C. If zirconium dioxide is prepared by hydrolysis of zirconyl nitrate or zirconyl chloride and the reaction product aged for 72 hours in the reaction solution, it crystallizes at just below 100° C. to give monoclinic zirconium dioxide (page 71). If the amorphous zirconium dioxide is dehydrated under reduced pressure, crystallization begins at 400°–450° C. (page 121).

Titanium dioxide can be prepared as an amorphous product by hydrolysis of titanium tetraethylate at 25° C. (page 85). At 70° C., it is still amorphous; at 370° C., it crystallizes to anatase (page 444), this occurring well below the glass transition temperature of 1000° C.

Amorphous germanium dioxide crystallizes after aging for two weeks in the reaction solution. In contrast, a sample dried rapidly under reduced pressure crystallizes at from 630° to 695° C., depending on the heating rate, and hence, as expected, above the measured glass transition temperature of 600° C. (page 446).

Mullite prepared by the sol-gel technique is amorphous up to 1150° C. It crystallizes above 1200° C. (page 121).

This shows that the processing window in terms of temperature and time for processing amorphous oxide powders to give glass moldings is either non-existent or impractical.

For this reason, it is also impossible to prepare oxide ceramics by sintering amorphous metal oxide powders to form a compact, glassy molding and then converting this to a crystalline oxide ceramic molding by increasing the temperature.

It is an object of the present invention to modify the essentially worthwhile process, which comprises first preparing glassy, compact moldings from amorphous starting powders and then crystallizing the moldings, in such a way that the said process can be used in practice.

We have found that this object is achieved by a process for the preparation of compact, crystalline and pore-free moldings from oxide ceramic by compressing an amorphous oxide powder at above the glass transition temperature and below the crystallization temperature and then heating the resulting glassy compact molding to above the crystalliztion temperature, wherein the amorphous oxide powder used is an oxide of aluminum, zirconium or silicon or a mixed oxide of silicon with these elements, in which some of the oxygen is replaced by nitrogen which is chemically bonded in the gel structure.

With materials of this type, the processing window in terms of temperature and time is sufficiently large to allow the materials to be pressed above the glass transition temperature to give compact, glassy moldings and then the latter to be crystallized. The crystallization process can, if necessary, be carried out using a local temperature gradient. If required, up to 70% by volume of inorganic fibers or whiskers can be added to the starting powders in order to increase rigidity, strength and toughness.

The amorphous oxide powders which contain bound nitrogen and are used as starting compounds for the novel process are prepared in a known manner from amorphous hydroxides or oxide hydroxides of the elements aluminum, zirconium and silicon or mixed oxides of silicon with these elements, in particular with aluminum. These hydroxides and oxide hydroxide powders may furthermore contain small amounts of beryllium, magnesium, yttrium and boron. Particularly suitable oxide hydroxides are those which are formed by hydrolysis of the corresponding metal alkoxides. For this purpose, the alkoxides are dissolved in an alcohol, such as methanol, ethanol, n-propanol, n-butanol or isopropanol. This solution is slowly run into a vessel containing about 10 times the amount, based of the alkoxide solution, of water, while stirring vigorously, and the hydrolysis may be carried out under either acid catalysis, preferably with hydrochloric acid, or alkaline catalysis, preferably with ammonia. During this procedure, the amorphous hydroxide or oxide hydroxide is precipated. The hydrolysis can be accelerated by increasing the water temperatures to 95° C.

If it is intended to prepare a binary compound, for example mullite ($3Al_2O_3.2SiO_2$), the alkoxides in the required molar ratio are dissolved in the alcohol, eg. isopropanol. A solution of 1 mole of water in isopropanol is run in per mole of the more rapidly hydrolyzing alkoxide, in this case the aluminum alkoxide, stirring being carried out, and the reaction mixture is refluxed for about 1 hour. In the partial hydrolysis which takes place, alcohol-soluble aluminum siloxanes are obtained. The hydrolysis is then completed in the manner described (J. Phys. Chem. Solids 45, No. 10, pages 1069 and 1074).

The amorphous hydroxides and oxide hydroxides are removed from the reaction solution by filtration or centrifuging. To improve the filtration behavior, small amounts, ie. from 0.0001 to 0.01%, based on the amount of water, of high molecular weight organic water-soluble polymers, such as polyacrylic acid, polyacrylamide or copolymers, may be added. Thereafter, the material is dried at up to 50° C. under reduced pressure. In the case of larger amounts, the hydroxides or oxides hydroxides can also be converted to powder form by spray drying. The powder dried in this manner is transferred to a pressure autoclave, where it is reacted with a stream of ammonia under ammonia partial pressures of from 1 to 50 kp/cm$^2$, the temperature being increased to 400°–1200° C. in the course of from 1 to 10 hours. During this procedure, hydroxyl and alkoxide radicals are substituted by ammonia, amino groups are incorporated and, through further condensation, silicon and/or metal atoms are bonded via nitrogen atoms (J. Amer. Ceram. Soc. 66, No. 11 (1983), 758).

The amount of oxygen to be replaced by nitrogen is dependent on the desired properties of the nitrogen-containing amorphous oxide powder, ie. on the particular difference desired between the glass transition temperature and the crystallization temperature. In the case of the individual oxides, it is sufficient to replace from 5 to 30%, preferably from 5 to 20%, of the oxygen by nitrogen in order to achieve this purpose. In the case of the mixed oxides of silicon, in particular the mixed oxides of silicon with aluminum, higher degrees of substitution of from 50 to 90% may also be maintained, making the technically interesting class of the $\beta'$-sialones accessible.

Substitution of oxygen by nitrogen results in an increase in the coordination of the metal atoms. This slightly increases the glass transition temperature and melt viscosity, which in particular is coupled with a reduction in the crystallization rate. On the other hand, the melting point is scarcely affected and, when the crystallization time is sufficiently long, a 100% or virtually 100% crystalline material is obtained.

This achieves the object of the invention, which is the preparation of glassy moldings from amorphous powders having a wide processing window in terms of temperature and time; ie. there is a sufficiently large interval between the glass transition temperature and crystallization temperature or the temperature at which crystallization as a function of time takes place to a still insignificant extent. Within this temperature range, the amorphous powders containing a bound nitrogen can be compressed to a glassy molding by the application of pressure and, since they are in a fluid state in this temperature range, the pressure in the molding material is transmitted uniformly, even to the most remote parts of the mold. This effect, which is not present during sintering of crystalline oxides, means that the novel process can be used to produce moldings having a complicated shape, in large numbers and in an economical manner, by means of a piston-type injection molding machine in production cycles which are restricted only by the flow of the molding material.

The glass transition temperature of an oxide powder to be used according to the invention can be determined by dilatometry by measuring the thermal expansion coefficient $\alpha$ as a function of the temperature. The thermal expansion coefficient increases uniformly with increasing temperature and abruptly increases more sharply when the glass transition temperature is reached.

The glass transition temperature can also be determined by differential scanning calorimetry (DSC). In this method, the heat supplied to a sample ($H = \Delta H/\Delta T = Cp$) is measured as a function of temperature. At the glass transition temperature, the specific heat increases abruptly so that at this point a step is recorded in the curve. The point of inflection of this step gives the glass transition temperature. When the temperature is increased further, the crystallization point is reached and the curve $H = f(T)$ passes through a peak, the beginning of which corresponds to the beginning of crystallization and the maximum of which gives the crystallization temperature. Since the measured values are usually dependent on the heating rate, the heating rate (in this case 48° C./min) is also stated.

In the second, subsequent process step, the amorphous glass molding is converted to the actual ceramic molding by crystallizing at an even higher temperature. Although this treatment is carried out under atmospheric pressure, the shape should nevertheless be maintained during the procedure in order to avoid shrinkage of the molding and hence a loss of dimensional accuracy. However, only small retaining forces are necessary for this purpose. Retention of shape is also necessary because, during the heating phase and until a minimum crystallinity of from 5 to 20% is reached, the lower viscosity may result in flow of the molding and hence in a loss of dimensional accuracy.

The duration of crystallization depends on the desired crystalline modification and on the temperature used and is in general about 10–100 minutes. To increase the crystallization rate and to establish the crystallite size, it is advantageous to add nucleating agents to the amorphous material to be processed, unless the latter is in any case already partially crystalline. Preferably, appropriately finely divided particles having the desired crystal structure of the molding are selected as nucleating agents. The particle sizes of the nucleating agents are from 0.001 to 1 $\mu$m, and the nucleating agents are used in concentrations of from 0.0001 to 1% by weight, so that from $10^9$ to $10^{15}$ nuclei per $cm^3$ are obtained.

In addition to the possibility of producing ceramic moldings which are absolutely free of pores and microcracks, the novel process has another important advantage:

If the crystallization of the molding is carried out using a local temperature gradient, it is possible to achieve directed crystallization which permits the alignment of certain crystallographic axes in a desired preferred direction. For example, it is possible for crystal faces in the direction of which the compressive strength or tensile strength is known to be particularly high to be positioned in the molding so that it is precisely these crystal faces which are in the direction of the maximum mechanical load.

Since in most cases the thermal expansion is anisotropic, ie. the crystal axes expand to different extents, it is advantageous if, by directed crystallization, the crystal axes are aligned in the molding in such a way that the thermal expansion is guided in the desired directions in the molding.

Another advantage of the novel process is displayed in the production of fiber-reinforced and/or whisker-reinforced moldings. According to the prior art, fibers and/or whiskers are mixed with the starting powders, and the green compact is then produced. The long fibers or whiskers hinder compaction, and undesirable pores are produced. This cannot occur in the novel process because the viscous glass flows around the reinforcing agents. If fibers or whiskers having greater rigidity than the oxide ceramic matrix are used, for example those based on silicon carbide, the stresses are optimally transmitted to the fibers or whiskers and good composite properties are achieved. The amount of reinforcing agents may be up to 70% by volume.

The moldings produced according to the invention can be used as structural elements having a high load capacity, in piston motors, gas turbines, heat exchangers or exhaust gas turbochargers or, for example, as substrates for integrated circuits.

EXAMPLE 1

383.2 g of zirconium tetrabutylate were dissolved in 1.2 l of isopropanol, and this solution was run into 10 l of water heated at 40° C., with vigorous stirring. The pH of the water was brought to 11 by adding ammonia. When the addition of the zirconium tetrabutylate solution was complete, stirring was continued for a further half hour, after which the precipitated amorphous zirconium oxide hydroxide was filtered off under suction and washed several times with water. The material was dried at up to 50° C. and under about 30 mbar in the course of 20 hours. When this material was heated at a heating rate of 4° C./min, it released water at above 100° C. and began to crystallize at about 460° C.

50 g of the amorphous zirconium dioxide hydroxide were transferred to an autoclave through which 500 ml/h of ammonia flowed. The ammonia pressure was kept at 20 bar. The autoclave was heated linearly as a function of time from room temperature to 600° C. in the course of 5 hours and then kept at 600° C. for 5 hours. The resulting water and alcohol residues were removed from the ammonia circulation by condensation.

The resulting amorphous zirconium dioxide powder had a nitrogen content of 1.3% by weight. Accordingly, 8.5% of the oxygen in the $ZrO_2$ had been replaced by nitrogen. Differential thermal analysis (heating rate 4° C./min) showed that crystallization began at about 2000° C., whereas the glass transition temperature was 1780° C. (at a heating rate of 50° C./min), with the result that a processing window of not less than 200° C. was obtained over a period of 1 hour.

The material was compressed in a press in the course of 5 minutes at 1950° C. and under 50 kp/cm$^2$ to give a disk having a diameter of 16 mm and a height of 10 mm. No pores larger than 10 μm were observed. The disk was then completely crystallized in a furnace at 2100° C. in the course of 20 minutes.

EXAMPLE 2

For the preparation of amorphous aluminum hydroxide, 204 g of aluminum triisopropylate (1 mole, dissolved in 1 l of isopropanol, were run into 5 l of water while stirring vigorously. The reaction temperature was 20° C., and the pH was brought to 9 by adding ammonia. The reaction solution was worked up using a laboratory spray drier, amorphous aluminum hydroxide powder being obtained. This material was dried at 50° C. and under about 30 mbar in the course of 20 hours. When this material was heated at a heating rate of 4° C./min., it released water at 100° C. and began to crystallize at about 350° C. About 100 g of the amorphous aluminum hydroxide were transferred to an autoclave and heated linearly from room temperature to 1000° C. under atmospheric pressure and under a stream of 300 ml/h of ammonia for 6 hours. Water and alcohol residues were removed from the ammonia circulation by condensation.

The resulting amorphous alumina powder had a nitrogen content of 4.55% by weight. Accordingly, 16% of the oxygen in the alumina had been replaced by nitrogen.

Differential thermal analysis (heating rate 4° C./min) showed that crystallization did not begin until about 1500° C., while the glass transition temperature, measured at a heating rate of 50° C./min, was about 1250° C.

The material was compressed in a press in the course of 4 minutes at 1350° C. and under 40 kp/cm$^2$ to give a disk having a diameter of 16 mm and a height of 8 mm. No pores larger than 5 μm were observed. The disk was then completely crystallized in a furnace at 1750° C. in the course of 10 minutes.

EXAMPLE 3

For the preparation of amorphous mullite, 612 g of aluminum triisopropylate (3 moles) and 416 g of silicon tetraethylate (2 moles) were dissolved in 6 l of isopropanol. 54 g of water (3 moles) dissolved in 500 ml of isopropanol, were run into this solution, while stirring. The reaction mixture was stirred for 3 hours at 80° C. and then run into 70 l of water which was heated at 50° C. and whose pH had been brought to 9 with ammonia, vigorous stirring beig continued. When the addition was complete, stirring was carried out for a further ½ hour, after which the precipitated material was filtered off under suction, washed again with water and dried at 60° C. and under about 25 mbar in the course of 20 hours. Differential thermal analysis coupled with thermogravimetric analysis showed that this material released water when heated, and crystallized at 1200° C. (at a heating rate of 4° C./min).

60 g of the amorphous material were transferred to an autoclave and treated with ammonia, as described in Example 1. Under a pressure of 10 bar, the flow rate of the ammonia was 300 ml/h. Heating was effected linearly to 1000° C. in the course of 4 hours, and the material was then kept at 1000° C. for a further 4 hours. Water and alcohol residues were removed from the circulation by condensation. The resulting amorphous mullite contained 3.8% by weight of nitrogen, ie. 13.3% of the oxygen had been replaced by nitrogen.

Differential thermal analysis (heating rate 4° C./min) showed that crystallization did not begin until 1540° C.; the glass transition temperature on the other hand was 1340° C. (heating rate 50° C./min), so that a processing window of about 200° C. was obtained.

The material converted to nitride was compressed in a press in the course of 8 minutes at 1400° C. and under 45 kp/cm$^2$ to give a disk having a diameter of 16 mm and a height of 9 mm. No pores were detectable under an optical microscope. The disk was then completely crystallized under atmospheric pressure in a furnace at 1700° C. in the course of 15 minutes.

EXAMPLE 4

For the preparation of a sialone, 326.7 g of silicon tetraethylate (1.57 moles) and 136.7 g of aluminum triisopropylate (0.67 mole) were dissolved in 4 l of isopropanol. A mixture of 12.06 g of water (0.67 mole) and 100 g of isopropanol was run into this solution, while stirring, and the reaction mixture was then stirred for 2 hours at 80° C. Thereafter, the vigorously stirred reaction mixture was run into 40 l of water which was heated at 40° C. and had been brought to a pH of 8.5 with ammonia. Stirring was continued for a further hour, after which the precipitated material was filtered off under suction, washed several times with water and then dried at 50° C. and under 30 mbar in the course of 24 hours. The amorphous material was transferred to an autoclave and exposed to a stream of ammonia from which water and alcohol residues were removed by condensation. When 200° C. had been reached, the ammonia pressure was brought to 40 bar and the temperature increased linearly to 600° C. in the course of 3 hours, after which the material was left at 600° C. for a further 30 hours. The amorphous material thus obtained contained 42% of Si, 17% of Al, 11% of O and 30% of N, ie. 82.5% of oxygen had been replaced by nitrogen. The glass transition temperature according to DSC was about 1280° C. (heating rate 50° C./min), and crystallization did not begin until 1600° C. (heating rate 4° C./min).

The material ws compressed in a hot press in the course of 8 minutes at 1550° C. and under 75 kp/cm$^2$ to give a disk having a diameter of 16 mm and a height of 12 mm. No pores were detectable under an optical microscope. The disk was completely crystallized at 1800° C. in a furnace in the course of 4 minutes under atmospheric pressure.

I claim:

1. A process for the preparation of a compact, crystalline and pore-free molding from an oxide ceramic which comprises: compressing an amorphous oxide powder containing a gel structure of aluminum, zirconium or silicon or a mixed oxide of silicon, in which a portion of the oxygen has been replaced by nitrogen which is chemically bonded in the gel structure of the amorphous oxide, at a temperature above the glass transition temperature and below the crystallization temperature and then heating the resulting glassy compact molding to above the crystallization temperature of the oxide or oxide mixture at atmospheric pressure.

2. The process as claimed in claim 1, wherein, in the case of the individual oxides, from 5 to 30% of the oxygen are replaced by bound nitrogen.

3. A process of claim 1, wherein, in the case of the mixed oxides of silicon, from 50 to 90% of the oxygen are replaced by bound nitrogen.

* * * * *